United States Patent [19]

Roffelsen

[11] 3,854,906
[45] Dec. 17, 1974

[54] DEVICE FOR VENTING AND AERATING CLOSED CIRCULATORY WATER FLOW SYSTEMS

[75] Inventor: Franciscus Roffelsen, NL-Helmond, Netherlands

[73] Assignee: N.V. Spiro Research, Helmond, Netherlands

[22] Filed: Jan. 8, 1973

[21] Appl. No.: 321,970

[30] Foreign Application Priority Data
Jan. 8, 1972  Germany .................... 2200904
Dec. 9, 1972  Germany .................... 2260349

[52] U.S. Cl. .................................. 55/159, 55/170
[51] Int. Cl. ........................................ B01d 19/00
[58] Field of Search ............. 55/159, 164, 185–187, 55/165, 201, 202, 169, 170; 137/202; 210/188, 436, 437

[56] References Cited
UNITED STATES PATENTS
1,424,756  8/1922  Dean et al. .................... 55/159
2,217,655  10/1940  Brassett ........................ 55/159
3,668,822  6/1972  Mannion ........................ 55/159

Primary Examiner—Charles N. Hart
Attorney, Agent, or Firm—Toren, McGeady and Stanger

[57] ABSTRACT

A venting and aerating arrangement for closed flow systems for water of fluctuating temperature is disclosed. A vent casing, defining an air collecting chamber, extends upwardly from a horizontal conduit of the system. A float controlled vent valve is arranged in the upper portion of the casing. A grid of spaced rods is arranged in the junction between casing and conduit and extends into the flow passage of the conduit to break up bubbles of air and other gases with the liberated gas ascending into the air collecting chamber. An improved valve construction is also disclosed.

17 Claims, 6 Drawing Figures

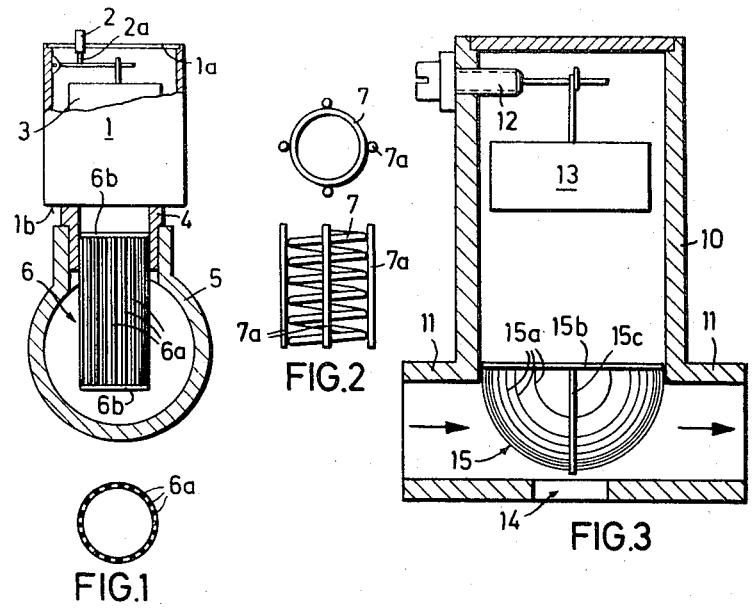
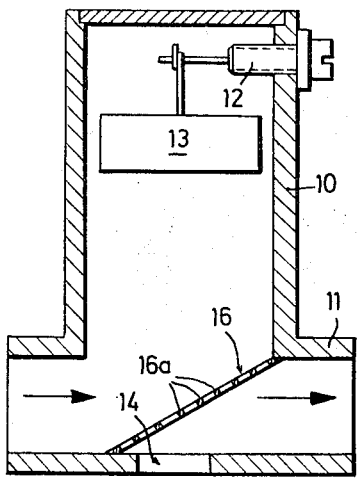
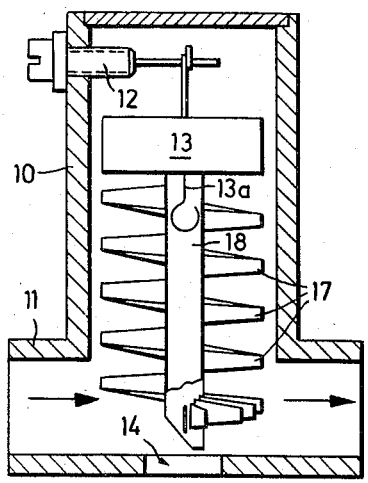

DEVICE FOR VENTING AND AERATING CLOSED CIRCULATORY WATER FLOW SYSTEMS

FIELD OF INVENTION

The invention relates to automatic arrangements for venting and aerating closed flow or conduit systems (hereinafter systems) which are operatively connected to a pressurized water supply container (accumulator), and through which water of fluctuating temperature is circulated by a pump or the like. The invention is particularly directed to such arrangements wherein an air collecting vessel is arranged at the upper end of a conduit tap of the system which tap extends upwardly from a horizontal or lying conduit portion of the circulatory system with a float-controlled discharge or vent valve establishing communication between this vessel and the outer or ambient air. Such arrangements are widely used, for example, in heating systems for apartment houses and the like.

BACKGROUND INFORMATION

The primary purpose of such arrangements is to permit the necessary air exchange between the water containing flow space of the system and the outside during filling and emptying of the system and when thermally caused volume changes take place in the circulating water. Further, such arrangements are also intended to collect and separate air residues, which have remained in the system, and other gases which have been formed during the operation of the system, which air residues and other gases are carried along by the circulating water in the form of bubbles of different sizes.

Prior art arrangements of this kind are sometimes referred to as "de-aerators" and comprise a valve which is arranged at the upper end of the air collecting vessel which customarily is in the form of an upright, usually cylindrical, vent tank or receptacle. The closure body of this valve is in these constructions normally held in closing position against the outer air by means of a spring or against the force of a spring. When the water in the air collecting vessel drops below a predetermined level, the closure body of the valve is opened by a float, which is arranged in the vessel and connected to the valve. In order to connect the vent casing of the arrangement which forms the air collecting vessel, with the flow conduit of the system, a threaded pipe or nipple is arranged at the outer face of the casing bottom. The threaded nipple is screwed into a complementary threaded bore of a horizontally extending conduit section of the circulatory system. The inner cross-section of this threaded pipe or nipple is not only substantially smaller than the cross-section of the air collecting vessel but is necessarily also substantially smaller than the inner cross-section of that portion of the circulatory system which is to be connected with the atmosphere through the valve. The threaded pipes or nipples are for this reason on the exterior always provided with pipe threads of one-eighth inch and only in exceptional cases with larger threads of at the most three-eighths inch. This means that the flow cross section of the threaded pipes is always considerably below $1 cm^2$ while, customarily the flow cross section amounts to but several $mm^2$.

Such prior art de-aerators generally fulfill their intended purpose satisfactorily during filling and emptying of the system, as well as during larger volume changes of the circulating water, by permitting an unobstructed exchange of air between the flow space of the system and the ambient or outer air, provided they are arranged at the highest point of the system. If they are thus arranged, the de-aerators serve at the same time as level controllers for the entire system if the system is connected to a supply container which holds pressurized water (accumulator) and maintains the volume of the water circulating through the system constant. During the operation of the system such de-aerators permit, however, the discharge of air and other gases which circulate with the operating water, only in respect of that air and those gases which have been effectively separated from the operating water and have been able to collect in the casing of the device above the water level, to wit, in the air collecting vessel or space.

Experience and extensive tests have, however, confirmed that successful operation of such de-aerators of the kind previously indicated, is at best possible for a relatively short operational period only, to wit, for the period during which the operating water maintains the characteristics of freshly filled tap water. The chemicals which are often added to the circulating water in heating systems and which are intended to dissolve calcium salts and to inhibit corrosion, significantly change the viscosity and surface tension of the water to such an extent that air and other gases which rise within the water, can no longer exit or penetrate through the surface of the water in unobstructed manner. The air and gases rather form bubbles at the water surface which in many instances are encased by a liquid skin which can be destroyed or ruptured with great difficulty only. This phenomenon increases the more extraneous substances are gradually taken up by the water from the conduit walls and their connecting or junction areas. The water then increasingly assumes the characteristics of an emulsion or colloidal liquid. This in turn results in the fact that below the apex of horizontal conduit pipes, bubbles, which are carried along by the relatively rapidly flowing water, pass by the junction areas of the prior art de-aerators without any exchange taking place between the gas contained in the bubbles and the water contained in the casing of the de-aerating device. This phenomenon increases and is aggravated after some time, since during passage of the operating water through the pump, bubbles, which initially were of relatively large size, are increasingly divided and thus made smaller and thereby better distributed within the water body, until a more or less viscous foam is formed which again does not reach the casing or air collecting space of the device. As a matter of fact, and as is well known from experience, larger foam concentrations, which are carried along by the circulating water, may cause serious operational disturbances. Thus, for example, when the pump rotor rotates within the foam concentrations, the speed of the rotor will suddenly increase with the result that the pump motor runs out of control. The pump then stops the water circulation and ultimately, due to dry run of the water lubricated bearings, both pump and motor are destroyed. This danger is particularly great in modern apartment heating systems, in which the pump oftentimes is arranged at the highest point of the circulatory system, a point which is particularly favorable for the collection of air in the pump space.

SUMMARY OF THE INVENTION

The primary object of the present invention is to provide an arrangement for the venting and aerating of closed circulatory flow systems of the indicated kind for water of fluctuating temperature, which arrangement, also after a long operational period, assures the continuous and effective removal into the atmosphere of gases, also in the form of foam, which are carried along by the operating water. For this purpose, it is necessary not only carefully to separate the gas from the circulating water but also to make sure that the separated gases are transferred into the casing of the de-aerating device which forms the air collecting vessel. Further, it is necessary to employ a venting or de-aerating valve with very short response time, which safely prevents the rise of the water in the de-aerating casing above the level determined by the float and up to the valve under all circumstances. In this manner, deposits and sediments in the region of the valve opening, at the valve seat and the closure body of the valve by corrosion and contaminants carried along by the water are effectively avoided.

Briefly, and in accordance with the invention, the above objects are obtained in an arrangement of the kind previously described, by providing a grid of fine rods or wire below the junction between the horizontal conduit section and the upwardly extending casing of the device, which grid extends at least over the upper portion of the inner cross-sectional area of the conduit section of the system connected to the casing.

Comparatively wide gaps or spaces between the individual rods of the grid, as well as the grid-free space in the conduit section below the grid, assure a practically undisturbed water circulation. The rods on the other hand, which, for example, may consist of thin wire, of a grid portion which is positioned in front of the entry passage into the venting tap, extend into the circulating water in the conduit section, and "cut up" or break up the water layers surrounding the bubbles which impinge on the rods, so that the gas liberated from the bubbles can more readily ascend behind the grid into the air collecting vessel or casing and, through the water in the casing, up to and beyond the water surface. The ascent of the gases is facilitated by the delayed flow velocity of the circulating water in the region of the grid, and can be further improved by shaping the grid in a suitable manner. Further, the rising of the gases can be facilitated by providing a grid or grid portion in the venting casing proper, to wit, above the junction between casing and conduit section.

Grid formations and arrangements are also feasible that facilitate the rising of the bubbles in that the grids offer the circulating water a lesser resistance while the resistance offered to the gas bubbles carried along by the water is, by contrast, greater.

However, experiments have indicated that sieve-like grids which are made from perforated plates or which are formed from crossing or intersecting rods or wires, are unsuitable, because neither larger gas bubbles nor foam penetrate then through the grid openings. Further, the grid openings are soon clogged by solid matter and other deposits which are carried along by the operating water. Moreover, grids of very narrow mesh size or grids which have become completely impermeable, lead to a damming of the water which may seriously affect the function and operation of a heating plant.

Extensive experiments and tests have indicated that grids, whose rods form the boundary of free passage-forming gaps or slots, are superiorly suitable, not only to dissolve larger bubbles and to separate them at an early stage, but also to separate viscous foam composed of fine bubbles, at least upon repeated passage through the grids. Such grids are capable of separating the larger bubbles and the foam from the operating water in a quantitative manner and to cause the rise of the resulting air or the like gas through the water and into the air collecting vessel of the casing of the device.

The grid acts the quicker and the better, the wider the junction zone from the conduit to the casing and the farther the grid extends over the inner cross section of the conduit section. The diameter of the junction opening should not be so small that the tap casing exerts the action of a pipette, in which the surface tension of operating water contained therein prevents the penetration of pressure-less gas, which is influenced by its own buoyancy only, through the downwardly situated junction opening into the casing. This is in contrast to the constructions of known de-aerators previously referred to. In order to prevent the pipette effect referred to, the diameter of a circular junction passage opening should not be smaller than about 10 mm. This condition can be met in prior art de-aerators only if at the securing area between casing and conduit section the inner diameter of the conduit section is substantially larger than the diameter of the connecting thread. However, even in the latter case, a grid which is secured at the threaded pipe or nipple of the device could only traverse a relatively small portion of the cross-sectional area of the conduit section. This means that substantial quantities of operating water would flow laterally past the grid without contacting the grid and the complete elimination of the carried-along gas quantities would then be dependent on the more or less incidental striking of the gas bubbles against the relatively narrow grid. The removal of gases would thus take a very long time and would not be very effective.

In order to overcome this disadvantage and to obtain an arrangement which is reliable under all operating conditions, the invention also provides that the inner cross-section of the tap or venting casing of the device is larger than the cross-section of the conduit section and that the conduit section is connected at the casing from opposing sides. In such a construction there is complete freedom in respect of the shaping and arrangement of the grid and the grid can be made so large that it extends over the complete cross-sectional area of the conduit section, primarily in horizontal direction. The grid need then only project to about one half of the depth of the flow of the circulating water in order to achieve that the gas bubbles, which preferably are carried along in the respective upper portion of the water, impinge on the grid and the water is only dammed or obstructed in this region to an insignificant extent.

As is apparent from the above, the details of the configuration and arrangement of the grid are dependent on the construction and configuration of the system in general. A grid which is secured to a vent casing with threaded nipple and which is thus inserted through the nipple into the conduit section of the system, has advantageously the shape of an upwardly open, hollow cylinder with rods that are arranged parallel to the thread axis and held between two rings. The grid, however, may also have the shape of a wire helix, whose axis is situated in the thread axis and whose individual turns form the "rods" of the grid.

In arrangements having conduit sections connected laterally to the vent casing of the device, the grid, while basically having the same shape, may also have substantially larger diameter, or the grid may have, for example, the shape of an upwardly open basket which is suspended into the circulating operating water. The rods of this basket extend, preferably in flow direction, between opposing areas of the upper rim in arc-shaped manner or over bending or buckling areas through the operating water. The shape of a wire helix in this case is also feasible, which helix is wound in screw formation on a carrier tube or mandril, the latter being arranged in the axis of the vent casing of the device and the windings or turns of the helix extending laterally in the casing to a position closely adjacent the casing wall and, in respect to height dimension, to a position closely adjacent below or even above the water level.

Experiments which have been carried out in a test plant with transparent conduit section and casing walls have indicated that in respect of the last-mentioned embodiment, bubbles and foam concentrations which have reached up to the lower end of the wire helix, have a tendency easily to penetrate into the helix but do no longer exit from the helix. Rather the gases liberated from the bubbles follow the turns of the helix and rise to the surface of the water contained in the casing. With such a configuration of the grid, a portion of the inner wall of the lower mandril or carrier tube end, which projects beyond the wire helix in a direction opposite to the flow direction of the water, may be exposed by inclined cutting to form a catching surface for water which carries bubbles and foam. In this manner the last-mentioned water, due to the pressure of the trailing water body and supported by the buoyancy of occluded gases, is driven upwardly within the carrier tube or mandril.

The upper portion of the carrier tube or mandril is, moreover, suitable for centering and guiding a lower part or projection of the float or of a complete, rod-like float.

In order to maintain the inventive venting device operational and functional for a practically unlimited period of time, the invention proposes a novel venting valve which is responsive to minimal float movements, to wit, it is responsive to very small fluctuations of the water column which supports the float, without any delay whatsoever.

In this manner a construction is achieved in which, also with small air spaces above the water column in the casing, the water under no circumstances contacts any portions of the valve. This is necessary so that valve portions, which are responsible for the functioning of the valve, are not subjected to frequent alternating influence of water and air which would lead to corrosion and deposits. Further, contaminations carried along by the water thus do not contact the valve.

The above requirements are superiorly met by a float-controlled valve which consists of conventional structure and new structure. The conventional structure of the float controlled valve comprises a cylindrical valve body which, in known manner, is insertable into an opening of the vent casing of the device. A ring or annular surface forms the valve seat and surrounds the inner mouth opening of an axial flow channel. Further, in conventional manner, a closure body is provided which is urged against the valve seat by a spring. The inventive structure which renders the fulfillment of the above requirements possible, is that the valve body forms the valve seat with the plane end face of an inwardly directed axial first extension of smaller diameter, that the closure body, which also consists of a cylindrical body of the same diameter, bears with the plane end surface of a second extension of smaller diameter against the valve seat under the force of the turns of a tension spring, the turns of the tension spring being tensioned in the region of the facing first and second extensions, the tension spring being screwed on the threaded outer surfaces of the valve body and the closure body, and that the float engages the closure body directly at that end which faces away from the valve seat.

In known valves a rocking lever carries the closure body. Due to the particular form and relative connection of the essential valve portions in the inventive valve, the provision of such a rocking lever and its support bearing is not necessary and is thus eliminated. In the inventive valve construction, the descending float causes a tilting of the closure body about the outer edge of the smaller one of the two opposing end faces of valve body and closure body. Due to the elimination of the bearing for the rocking lever, a principal trouble source of the known valves is thus eliminated. Further, the lever arm which is formed by the radius of the smaller end face may, in comparison to the load arm which is determined by the point of engagement of the float, have extremely small dimensions. In this manner, a most reliable functioning of the valve is obtained and also a very short response time. This also holds true if, in the interest of reliable sealing, the exteriorly situated, relatively large valve spring exerts a great force. In order to overcome this great force for the purpose of reliably opening the valve, very small active float weights are sufficient due to the fact that the spring is subjected to bending deformation. The larger the closing force of the spring, the harder may be the sealing contact on the end face of the closure body, and the harder this sealing contact, the smaller is its wear and the smaller is the tilting angle which is required in order to open the valve. Due to the small tilting angle and the small effective float weight, which is rendered possible by the large lever transmission, the valve responds even to the smallest fluctuations of the water column which carries the float. Thus, very light and hence small floats may successfully be used. Even if the vent casings of the device have relatively small cross-sections, the floats may be constructed as bodies of small height, for example, in the form of relatively thin, flat discs, a construction which further benefits the response precision.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described the preferred embodiments of the invention.

IN THE DRAWINGS

FIG. 1 shows one embodiment of an inventive venting device which, through a threaded nipple, is connected to a horizontal or lying conduit section of a circulatory flow system, as well as a cross-section of the particular grid used in this embodiment;

FIG. 2 shows a different embodiment for the grid of the device according to FIG. 1;

Figure 6:
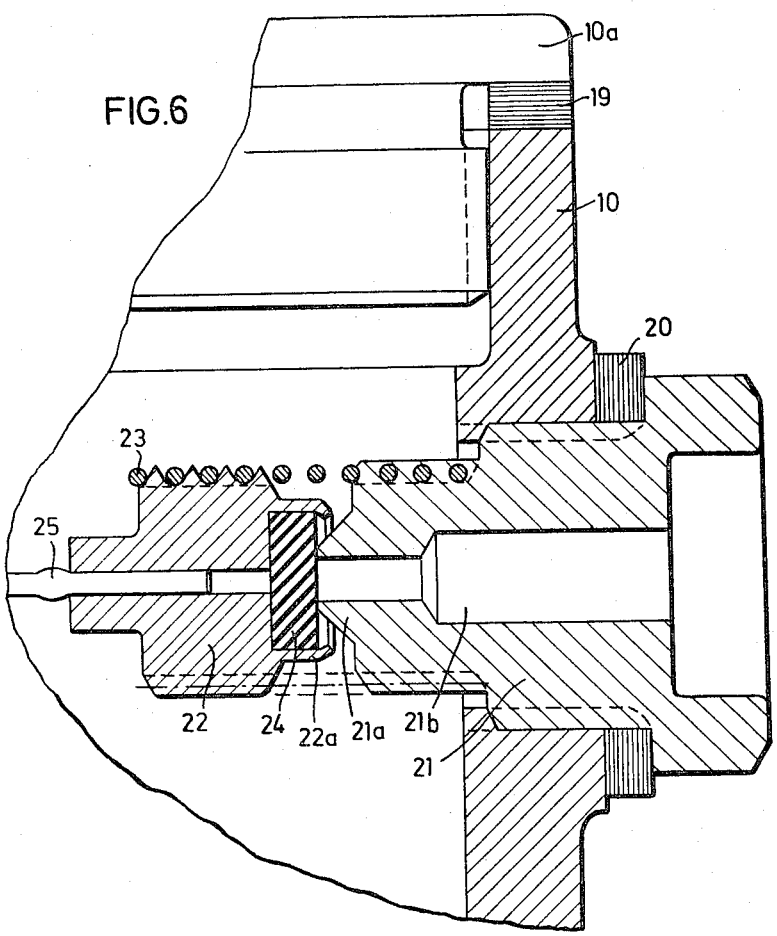

FIGS. 3, 4 and 5 show arrangements whose casing, which forms the vent tap of the system, has a larger cross section than the conduit section of the system to which the casing is connected and whose confining wall is provided at opposing areas with connections to the conduit section of the circulatory flow system, wherein in FIG. 3 the grid has a basket-like configuration while in FIG. 4 a flat grid with horizontal rods is arranged obliquely in the flow of the circulating water;

FIG. 5 shows a grid which is a screw-like wire helix or spiral wound on a central support tube or mandril; and FIG. 6 is a representation of the venting valve of the invention on enlarged scale.

Referring now to the drawings, the arrangement according to FIG. 1 comprises in known manner a cylindrical vent casing 1. The casing 1 has a cover or lid 1a into which is inserted a valve 2 whose closure body 2a is normally maintained in engagement with its seat. This is accomplished by a force which acts from the inside on the closure body and against the ambinet outer air. The arrangement also includes a float 3 which, when the water level in the casing 1 drops below a predetermined level, draws the closure body from its seat and thereby opens the valve against the outer air until the casing 1 is again filled with water from the supply of an accumulator or storage tank (not shown) to reach the predetermined level.

The casing 1 is connected to a horizontal or lying header portion or conduit section 5 of a circulatory flow system. This is accomplished by a threaded nipple 4 which projects downwardly from the casing bottom 1b and which is screwed into a suitable inwardly threaded connecting flange of the conduit section 5. The casing 1 thus extends upright relative to the horizontal conduit section 5. In contrast to known arrangements of this kind, the flow cross-sectional area of the threaded nipple 4 is so large that the casing 1 does not act as a pipette so that air under atmospheric pressure does not prevent operating water in the casing from flowing out when the valve 2 is closed.

A hollow cylindrical grid 6 extends into the conduit section through the passage opening or junction between the conduit section 5 and the nipple of the casing 1. This grid 6 is secured at the end of the threaded nipple 4 and consists essentially of a plurality of thin rods 6a which extend parallel to the axis of the nipple. The opposite ends of these rods are connected in spaced relationship to rings 6b, one at each end. In a preferred embodiment, the distances between the rods are advantageously not all equal - as shown - but rather increase from the central vertical axis plane of the conduit 5 towards both sides in such a manner that the projections of the rods onto a transverse plane would have equal distances. In such a construction, however, difficulties may be encountered concerning the alignment of the grid after the device has been screwed into the flow system.

Such difficulties, however, are avoided by using a grid, wherein the rings are arranged generally horizontally as distinguished from the vertical showing of FIG. 1.

FIG. 2 shows a grid embodiment which is similar to the last-mentioned construction. The grid of FIG. 2 may be used in conjunction with the structure for the flow system as shown in FIG. 1. Thus, the grid of FIG. 2 consists of a wire helix 7, whose turns are reinforced or stiffened by a few rods 7a which extend parallel in axial direction and which maintain the turns of the helix at the desired distance.

It will be appreciated that devices with threaded nipples of sufficiently large inner diameter can only be used in connection with systems wherein the respective conduit section of the system has a relatively large diameter and relatively large wall thickness.

For this reason, in the embodiments of FIGS. 3, 4 and 5, the cross-section of the casing 10, which forms the vent tap, is larger than the cross-section of the conduit section 11 of the flow system, the conduit section 11 being integrally connected at opposite areas with the lower portion of the confining wall of the casing 10. The valve 12, which is controlled by the float 13, is here inserted into a bore in the upper portion of the confining wall of the casing 10. An opening 14 in the bottom of the casing 10 serves the purpose to connect a line or conduit to the accumulator or water tank (not shown).

In a manner similar as in the embodiments of FIGS. 1 and 2, the grid may consist of vertical straight rods or of a wire helix with vertical axis, the rods or wire helix extending from above the junction zone between the conduit section and the casing downwardly into the operating water which flows through the system.

In the embodiment of FIG. 3, a basket-shaped grid 15 is suspended from above the junction where the line or conduit section 11 opens up into the casing 10. The effective portion of the grid 15 comprises half-rings 15a which are of wire and extend parallel or concentric to each other. The free ends of the half-rings are secured to a horizontally extending ring 15b. Moreover, the basket thus formed is reinforced by a wire stirrup 15c. The basket extends vertically downwardly in the flow direction of the circulating water.

A substantially similar effect is obtained with a basket-like grid composed of complete rings which are horizontally arranged one above the other.

In the embodiment of FIG. 4, a grid 16 is shown which is formed from horizontal rods which extend all in one plane, the grid extending obliquely across the cross-sectional area of the conduit section 11. The grid thus separates the casing 10 from that portion of the conduit 11 which, seen in the flow direction, is located behind the casing. The upper side of the grid 16 opposes the water flow. The thickness of the rods and the distances between the rods are chosen such that the lower apex of each rod and the upper apex of an adjacent lower rod are situated in a horizontal plane. In this manner, gas bubbles, which are carried by the water, are supported by their buoyancy, deflected upwardly as over a continuous surface, while the water continues to flow through the spaces between the rods with insignificant deflection, to wit, it flows in a straight path without substantial obstruction.

In the embodiment of FIG. 5 the grid comprises several turns of a wire helix 17 with longitudinallyrectangular or trapezoidal-shaped wire windings. These wire turns are wound in screw-like manner onto a carrier tube or mandril 18 and are secured to the outer surface of the mandril.

The turns of the wire helix 17 extend radially substantially further than in the axial direction. The helix 17 occupies with several turns the cross-sectional area of that portion of the casing 10, which is above the junction of the casing with the conduit 11 and projects with one complete turn into the flow region of the circulating water in the conduit section 11.

At the lower end of the mandril 18 which projects beyond the lower extremity of the wire helix 17, the end wall is partially cut away so that a portion of its inner wall opposes the flow direction of the circulating water, the flow direction being indicated by the arrows.

The upper end of the mandril 18 embraces a lower projection 13a of the float 13, whereby the float can be readily centered in the casing 10. Further, in this manner the float is securely guided during its movement.

The venting valve of FIG. 6 has been illustrated in enlarged manner for clarity's sake. The valve comprises a cylindrical valve body 21. This valve body 21 is screwed from the outside into an opening of the circumferential wall 10 of the casing with a washer or gasket 20 being interposed. It will be noted that the valve body 21 is situated closely below the casing cover 10a with the gasket 19. The valve moreover comprises the closure body 22 and the valve spring 23. The valve body 21 is inwardly provided with an axial extension 21a of smaller diameter. The end face of this extension 21a surrounds the inner outlet or mouth of the axial flow channel 21b and forms the seat for the closure body 22. This cylindrical closure body 22 has the same diameter as the valve body 21 and is also provided with an extension or abutment 22a of smaller diameter, whose end face is provided with a sealing member 24. The closure member bears with the sealing member 24 against the seat of the valve body 21 when the valve is closed. The closure body 22 is secured at the valve body 21 by means of a coil spring 23. The valve body 21 and the closure body 22 have exteriorly cut threads by means of which they are screwed into the coil spring 23 from both ends to such an extent that after contact of the end faces of their extensions 21a and 22a, the turns of the spring 23, which surround these extensions under a distance, are tensioned.

The spring serves at the same time thus also as a valve spring of adjustable force, as carrier for the valve body and as universal joint for the valve members 21 and 22 connected by the spring. A rod 25, which is inserted into the free end of the closure body 22, serves the purpose to suspend the float which is not shown in FIG. 6.

Since the coil spring, whcih forms the joint between closure body and valve body, has the natural capability to move in any direction and during such movement in any direction the valve would be opened, the float is suspended in such a manner that during its upward movement the closure body 22 is not taken along. Advantageously an abutment is provided at the casing cover 10a which prevents upward movement of the float beyond its idling path.

Since in the above described valve the buoyancy force of the float is not utilized for the closure movement and the effective float weight, to wit, the difference between its specific weight from that of water may be small, the float should not be formed as a hollow body but preferably as a massive, solid body of a material of correspondingly low specific weight. This material should, of course, not have a tendency to absorb water and should retain its shape and form even at temperature fluctuations between 0 and 100°C. Polypropylene is superiorly suitable for this purpose.

By contrast, if hollow floats are used, as is customary in prior art constructions, the danger exists that after prolonged operation the float structure is no longer sufficiently water tight and gradually absorbs water. This, of course, increases the weight of the float until ultimately the valve is no longer closed and exiting water may thus cause considerable damages. This is effectively prevented by using a solid float in accordance with the proposal of this invention.

What is claimed is:

1. In combination with a horizontally extending conduit of a closed flow system, wherein water of fluctuating temperature is pumped and circulated through conduit means and the system is operatively connected to a pressurized water source, a venting and aerating tap comprising:
    a. a vent casing extending upwardly from said horizontally extending conduit and defining a collecting chamber;
    b. means connecting said chamber and the flow passage of said conduit to form a junction between said conduit flow passage and said casing chamber;
    c. a vent valve arranged on said casing and being capable of establishing communication between said chamber and the outside;
    d. a float member operatively connected to said valve and located within said chamber and opening and closing the valve in response to the water level in said chamber; and
    e. a grid positioned in said junction and extending over at least a portion of the cross-sectional area of said flow passage, said grid being formed from rod or wire means which, as distinguished from fine-mesh sieves, define comparatively large size gaps.

2. A tap as claimed in claim 1, wherein said casing is substantially cylindrical.

3. A tap as claimed in claim 1, wherein said connecting means is a threaded nipple connected to said conduit and said casing to form said junction, the cross-sectional flow area of said nipple being sufficiently wide so as not to impede the flow of water from the casing chamber when said valve is closed and when said water is in pressure contact with air of atmospheric pressure.

4. A tap as claimed in claim 3, wherein said grid is tube shaped and extends from said nipple into said flow passage.

5. A tap as claimed in claim 1, wherein the cross-sectional area of said casing is larger than that of said flow passage of the conduit, said conduit being connected to said casing at opposite areas of its confining wall.

6. A tap as claimed in claim 1, wherein said grid extends to a level above said junction, said grid also extending across the cross-sectional area of said casing and projecting at least partially into the water circulating through said flow passage.

7. A tap as claimed in claim 1, wherein said grid is formed from a plurality of spaced parallel rods with the rods forming a tube shaped body.

8. A tap as claimed in claim 1, wherein said grid is formed from wire rings or wire half-rings which extend parallel to each other and in the flow direction of the water.

9. A tap as claimed in claim 1, wherein said grid extends within and across the flow passage of said conduit so as to separate said casing from that portion of the conduit flow passage which, seen in the flow direction of the water, starts downstream of the casing, said grid being composed of a plurality of spaced rods and being obliquely positioned across said flow passage with the upper surface of said grid opposing the water flow through said conduit.

10. A tap as claimed in claim 9, wherein the thickness of the rods and the spaces between the rods are dimensioned in such a manner that the lower apex of each rod is situated in a horizontal plane with the upper apex of the adjacent lower rod.

11. A tap as claimed in claim 1, wherein said grid is composed of a wire helix having a plurality of turns, said wire helix being wound in screw-like manner on a hollow, open-ended mandril extending axially within said casing chamber, said wire helix extending between the confining wall of the casing chamber and said mandril, at least one complete turn of said helix being positioned in the flow passage of said conduit and at least one complete turn being located within said chamber.

12. A device as claimed in claim 1, wherein said float is made of a solid body and of a material having a specific weight smaller than 1.

13. In combination with a horizontally extending conduit of a closed flow system, wherein water of fluctuating temperature is pumped and circulated through conduit means and the system is operatively connected to a pressurized water source, a venting and aerating tap comprising:
a. a vent casing extending upwardly from said horizontally extending conduit and defining a collecting chamber;
b. means connecting said chamber and the flow passage of said conduit to form a junction between said conduit flow passage and said casing chamber;
c. a vent valve arranged on said casing and being capable of establishing communication between said chamber and the outside;
d. a float member operatively connected to said valve and located within said chamber and opening and closing the valve in response to the water level in said chamber; and
e. a grid positioned in said junction and extending over at least a portion of the cross-sectional area of said flow passage, said grid being formed by a wire helix having a plurality of turns, said wire helix being wound in screw-like manner on a hollow, open-ended mandril extending axially within said casing chamber, said wire helix extending between the confining wall of the casing chamber and said mandril, at least one complete turn of said helix being positioned in the flow passage of said conduit and at least one complete turn being located within said chamber, the upper end of said mandril extending up to the water level of said casing, while its lower end extends downwardly beyond said wire helix and has an inclined surface portion, a portion of said surface portion opposing the flow of water through the flow passage of said conduit.

14. In combination with a horizontally extending conduit of a closed flow system, wherein water of fluctuating temperature is pumped and circulated through conduit means and the system is operatively connected to a pressurized water source, a venting and aerating tap comprising:
a. a vent casing extending upwardly from said horizontally extending conduit and defining a collecting chamber;
b. means connecting said chamber and the flow passage of said conduit to form a junction between said conduit flow passage and said casing chamber;
c. a vent valve arranged on said casing and being capable of establishing communication between said chamber and the outside;
d. a float member operatively connected to said valve and located within said chamber and opening and closing the valve in response to the water level in said chamber; and
e. a grid positioned in said junction and extending over at least a portion of the cross-sectional area of said flow passage, said grid being formed by a wire helix having a plurality of turns, said wire helix being wound in screw-like manner on a hollow, open-ended mandril extending axially within said casing chamber, said wire helix extending between the confining wall of the casing chamber and said mandril, at least one complete turn of said helix being positioned in the flow passage of said conduit and at least one complete turn being located within said chamber, said mandril having a hollow upper portion which embraces in spaced manner a portion of said float member, whereby said mandril acts as guide for said float member.

15. In combination with a horizontally extending conduit of a closed flow system, wherein water of fluctuating temperature is pumped and circulated through conduit means and the system is operatively connected to a pressurized water source, a venting and aerating tap comprising:
a. a vent casing extending upwardly from said horizontally extending conduit and defining a collecting chamber;
b. means connecting said chamber and the flow passage of said conduit to form a junction between said conduit flow passage and said casing chamber;
c. a vent valve arranged on said casing and being capable of establishing communication between said chamber and the outside;
d. a float member operatively connected to said valve and located within said chamber and opening and closing the valve in response to the water level in said chamber; and
e. a grid positioned in said junction and extending over at least a portion of the cross-sectional area of said flow passage, said grid being formed from gap-defining rod or wire means, said vent valve comprising a cylindrical valve body inserted into an opening of said casing and having an axial flow channel and a valve seat surrounding the inner outlet end of said flow channel, said valve further comprising a closure body and a spring urging said closure body against the valve seat, said valve being further characterized in that the valve body (21) forms the valve seat with the plane end face of an inwardly directed axial extension (21a) of smaller diameter than the valve body proper, that the closure body (22) is a cylindrical body having an extension (22a) of smaller diameter which faces the extension (21a) and whose plane end face is urged against the valve seat under the force of said spring (23), said spring being engaged in the threads of the threaded exterior surfaces of said valve body (21) and the closure body (22), the turns of the spring being tensioned in the region of said extensions, and that the float member (6) engages the closure body (22) directly at its end that faces away from the valve seat.

16. A device as claimed in claim 15, wherein one of said end faces is provided with a sealing member (24) of yieldable material.

17. A device as claimed in claim 15, wherein the closure body is provided with means (25) for suspending the float member, said means being arranged on the end facing away from the valve seat.

* * * * *